US012655967B1

(12) United States Patent
Xu et al.

(10) Patent No.: US 12,655,967 B1
(45) Date of Patent: Jun. 16, 2026

(54) MOUNTING BRACKET FOR A LAMP

(71) Applicant: SHENZHEN SNC OPTO ELECTRONIC CO., LTD., Shenzhen (CN)

(72) Inventors: Jianyong Xu, Shenzhen (CN); Zhiping Ma, Shenzhen (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 19/193,959

(22) Filed: Apr. 29, 2025

(30) Foreign Application Priority Data

Feb. 26, 2025 (CN) ......................... 202520314345.8

(51) Int. Cl.

| | |
|---|---|
| ***F21V 21/30*** | (2006.01) |
| ***F21V 21/02*** | (2006.01) |
| ***F21V 23/00*** | (2015.01) |
| *F21Y 115/10* | (2016.01) |

(52) U.S. Cl.
CPC .............. *F21V 21/30* (2013.01); *F21V 21/02* (2013.01); *F21V 23/002* (2013.01); *F21Y 2115/10* (2016.08)

(58) Field of Classification Search
CPC .. F21S 6/005; F21V 23/0464; F21V 23/0471; F21W 2131/103
See application file for complete search history.

(56) References Cited

U.S. PATENT DOCUMENTS

| | | | | |
|---|---|---|---|---|
| 10,738,982 | B1 * | 8/2020 | Orellana | F16M 13/02 |
| 11,231,152 | B1 * | 1/2022 | Thompson | F21S 8/003 |
| 11,739,895 | B1 * | 8/2023 | Zheng | F21V 21/26 362/249.02 |
| 2017/0167701 | A1 * | 6/2017 | Erdener | F21V 7/00 |
| 2019/0162401 | A1 * | 5/2019 | Verdes | F21V 25/12 |
| 2021/0356098 | A1 * | 11/2021 | Liu | F21V 23/009 |

* cited by examiner

*Primary Examiner* — Leah Macchiarolo

(57) ABSTRACT

A mounting bracket for a lamp is provided. The mounting bracket includes a mounting member and a connecting block, the connecting block is rotatably connected to the mounting member to adjust an angle between the connecting block and the mounting member, the connecting block includes a fixing base and a main body, the fixing base is connected to a lamp body of the lamp, and the mounting member is configured to be connected to a fixed object.

9 Claims, 4 Drawing Sheets

MOUNTING BRACKET FOR A LAMP

CROSS-REFERENCE TO RELATED APPLICATIONS

This application claims priority of Chinese Patent Application No. 202520314345.8, filed on Feb. 26, 2025, the entire content of which is incorporated herein by reference in its entirety.

TECHNICAL FIELD

The present disclosure relates to lighting devices, and in particular to a mounting bracket for a lamp.

BACKGROUND

LED lamps can be mounted to various structures. For example, in outdoor applications, it may be necessary to mount the LED lamp to a lamp pole extending vertically, a lamp pole extending horizontally, or to a wall or other structure having a flat surface. Conventional fixing supports are usually integrated with the LED lamps, so that the structure of the fixing support of the LED lamp needs to be changed according to the site, which increases material and labor costs, and when the fixing support is damaged, the fixing support is not convenient to replace due to the integrated structure of the fixing support and the LED lamp.

SUMMARY

According to various embodiments, a mounting bracket for a lamp is provided to address the above problem.

A mounting bracket for a lamp is provided, which includes a mounting member and a connecting block, the connecting block is rotatably connected to the mounting member to adjust an angle between the connecting block and the mounting member, the connecting block includes a fixing base and a main body, the fixing base is connected to a lamp body of the lamp, and the mounting member is configured to be connected to a fixed object.

In one of the embodiments, the mounting member is provided with a vertical opening and configured to be connected to the fixed object.

In one of the embodiments, a side wall of the mounting member is provided with a wire receiving hole for a wire to extend through.

In one of the embodiments, the mounting bracket further includes a conversion bracket mounted to an end of the mounting member away from the connecting block, one side of the conversion bracket is connected to the mounting member through a quick dismounting structure, and another side of the conversion bracket is configured to be connected to the fixed object.

In one of the embodiments, the fixing base has a first cavity, the main body has a second cavity, the mounting member has a third cavity, the first cavity is in communication with an interior of the lamp body, and the second cavity is in communication with the first cavity and the third cavity.

In one of the embodiments, the conversion bracket includes a connecting member extending through the third cavity, the connecting member is provided with a positioning column, and a side wall of the third cavity is provided with a through hole, and when the connecting member extends through the third cavity, the positioning column is engaged in the through hole.

In one of the embodiments, wherein the conversion bracket further includes a protrusion, the mounting member is provided with a fixing groove corresponding to the protrusion, and the protrusion is received in the fixing groove.

In one of the embodiments, the mounting bracket further includes a fixing block, the conversion bracket is connected to the fixed object through the fixing block, and a silicone pad is provided between the conversion bracket and the fixing block.

In one of the embodiments, the main body is of a columnar structure, the main body includes a plurality of first teeth that enclose a circle, the mounting member includes a plurality of second teeth adapted to the plurality of first teeth, the main body is rotated relative to the mounting member by engaging the first teeth with the second teeth, so as to adjust the angle between the mounting member and the connecting block.

In one of the embodiments, the main body and the mounting member are fixed by a first fixing member, and the first fixing member extends through the mounting member and the main body to fix the mounting member and the connecting block.

According to the mounting bracket, the connecting block is rotated relative to the mounting member to adjust the angle between the two, which is convenient for an operator to adjust to the desired angle. When the lamp needs to be mounted to a lamp pole that extends vertically or horizontally, the fixing base located on the connecting block is connected to the lamp body, and the mounting member is directly connected to the lamp pole. When the lamp needs to be mounted to a wall or other structure with a flat surface, the mounting member is connected to the wall or other structure with a flat surface through the conversion bracket. A variety of flexible methods to mount the lamp are realized, which saves the cost of replacing the mounting bracket. Since one side of the conversion bracket is connected to the mounting member through the quick disassembly structure, the mounting bracket can be quickly disassembled and assembled, which is more convenient for replacement or maintenance.

The details of one or more embodiments of the application are set forth in the accompanying drawings and the description below. Other features, objects, and advantages of the application will be apparent from the description and drawings, and from the claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DESCRIPTION OF REFERENCE SIGNS

Figure 1:
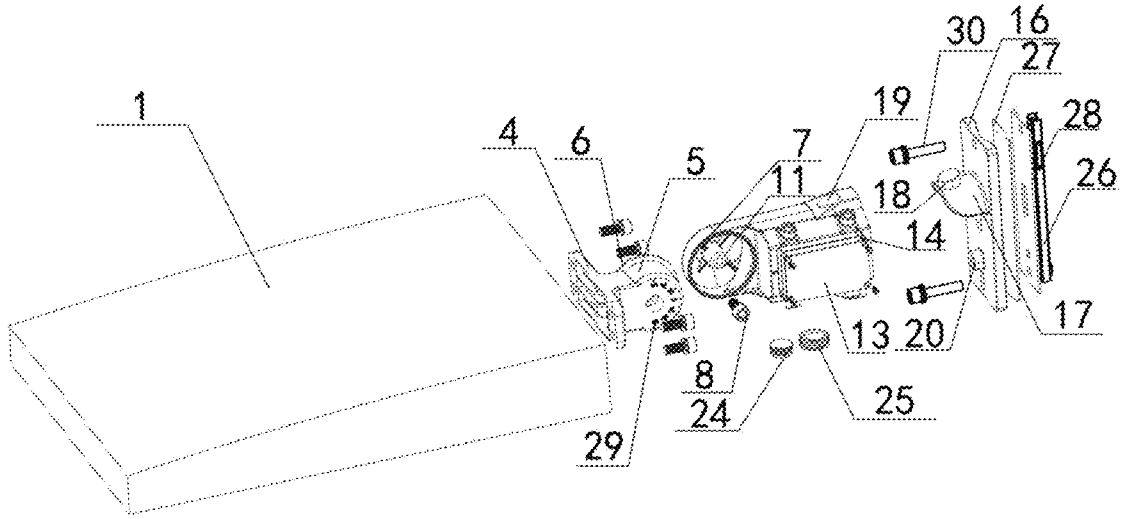
FIG. 1 is an exploded view of an LED lamp according to a first embodiment of the present disclosure.
Figure 2:
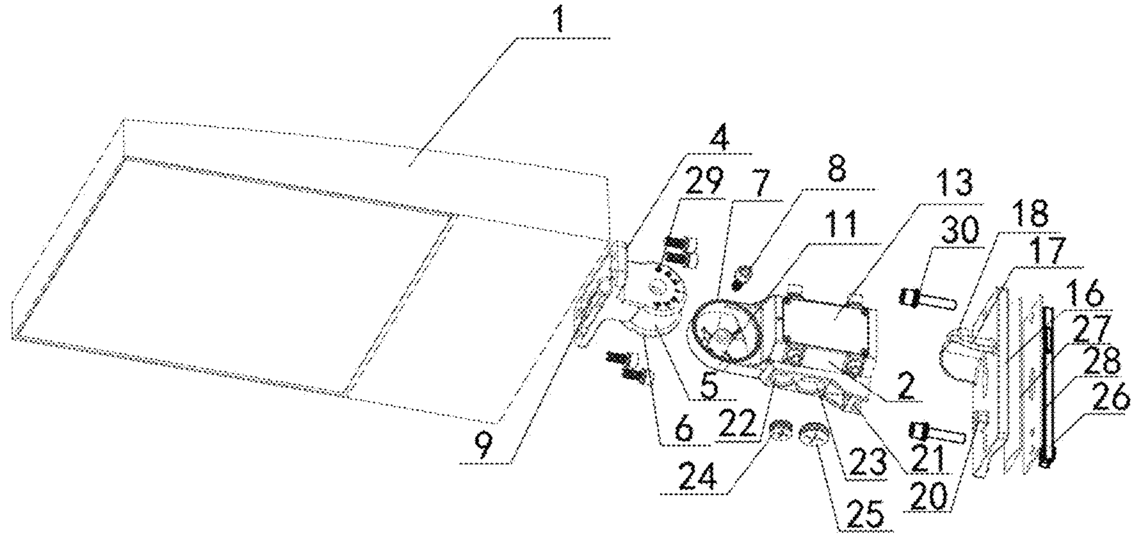
FIG. 2 is similar to FIG. 2, but viewed from another aspect.

1. Lamp body; 2. Mounting member; 3. Connecting block; 4. Fixing base; 5. Main body; 6. First tooth; 7. Second tooth; 8. First fixing member; 9. First cavity; 10. Second cavity; 11. Third cavity; 12. Wiring opening; 13. Wiring cover; 14. Waterproof silica gel; 15. Vertical opening; 16. Conversion bracket; 17. Connecting member; 18. Positioning column; 19. Through hole; 20. Protrusion; 21. Fixing groove; 22. Wire receiving hole 1; 23. Wire receiving hole 2; 24. Plug 1; 25. Plug 2; 26. Fixing block; 27. First silicone pad; 28. Second silicone pad; 29. Angle gauge; 30. Third fixing member.

DETAILED DESCRIPTION OF THE EMBODIMENTS

The technical solution in the embodiment of the present disclosure will be clearly and completely described below in conjunction with the drawings in the embodiment of the application. Apparently, the described embodiments are only some of the embodiments of the application, not all of them. Based on the embodiments in the present disclosure, all other embodiments obtained by a person skilled in the art without making creative efforts shall all fall within the protection scope of the present disclosure.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 6, a mounting bracket for a lamp according to a first embodiment is provided. The mounting bracket includes a mounting bracket assembly, one end of the mounting bracket assembly is mounted to a lamp body 1 of the lamp, and the other end of the mounting bracket assembly is configured to be connected to a fixed object such as a lamp pole, a wall, a horizontal plane, etc. The mounting bracket assembly includes a mounting member 2 and a connecting block 3. The connecting block 3 is rotatably connected to the mounting member 2 to adjust an angle between the connecting block 3 and the mounting member 2. The connecting block 3 includes a fixing base 4 and a main body 5. The fixing base 4 is connected to the lamp body 1. The fixing base 4 and the lamp body 1 can be fixed by screws. The mounting member 2 is configured to be connected to the fixed object.

The main body 5 is of a columnar structure. The main body 5 includes a plurality of first teeth 6 that enclose a circle. The mounting member 2 includes a plurality of second teeth 7 adapted to the plurality of first teeth 6. The main body 5 is rotated relative to the mounting member 2 by engaging the first teeth 6 with the second teeth 7, so as to adjust the angle between the mounting member 2 and the connecting block 3. Specifically, the main body 5 is cylindrical. The circle of first teeth 6 is provided on a side of the main body 5 facing the mounting member 2. In an embodiment, the first teeth 6 are evenly arranged around an axis of the main body 5, and the first teeth 6 are located on a periphery of the side of the main body 5 facing the mounting member 2. A circle of second teeth 7 is provided on the mounting member 2 corresponding to the first teeth 6. The second teeth 7 and the first teeth 6 are coaxially provided opposite to each other, and the second teeth 7 and the first teeth 6 are engaged with each other.

The main body 5 and the mounting member 2 are fixed by a first fixing member 8. The first fixing member 8 extends through the mounting member 2 and the main body 5 to fix the mounting member 2 and the connecting block 3. The first fixing member 8 may be a bolt, and the first fixing member 8 extends through a center of the first tooth 6 and a center of the second tooth 7.

Figure 3:
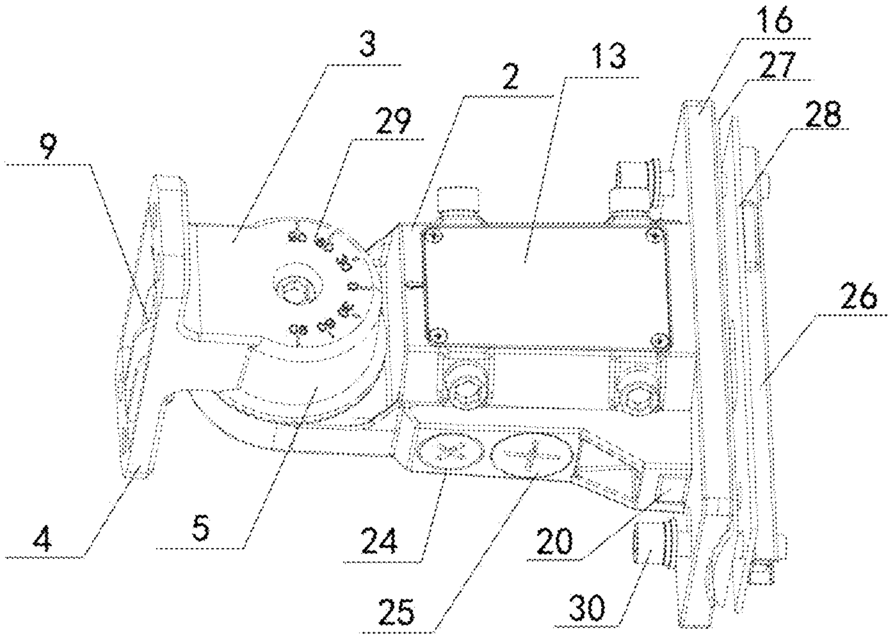
FIG. 3 is a perspective view of a mounting bracket according to the first embodiment of the present disclosure.
Figure 4:
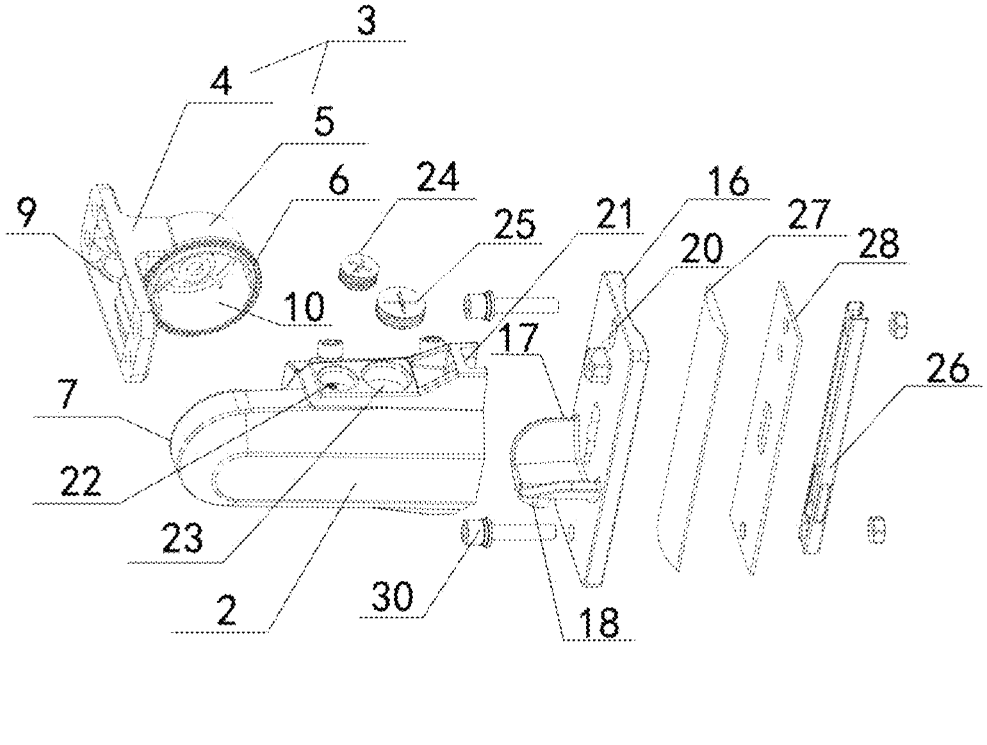
FIG. 4 is an exploded view of the mounting bracket of FIG. 3.
Figure 5:
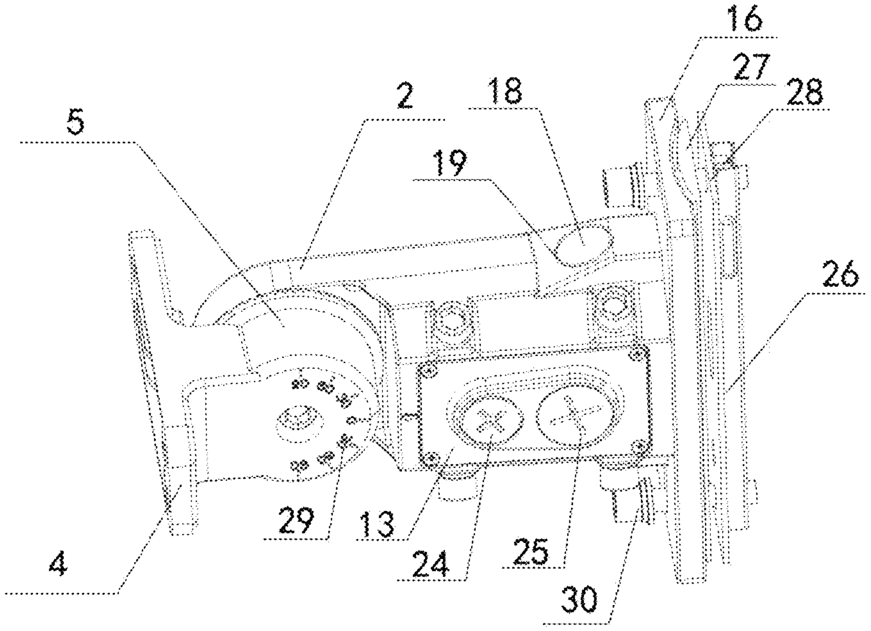
FIG. 5 is a perspective view of a mounting bracket according to a second embodiment of the present disclosure.
Figure 6:
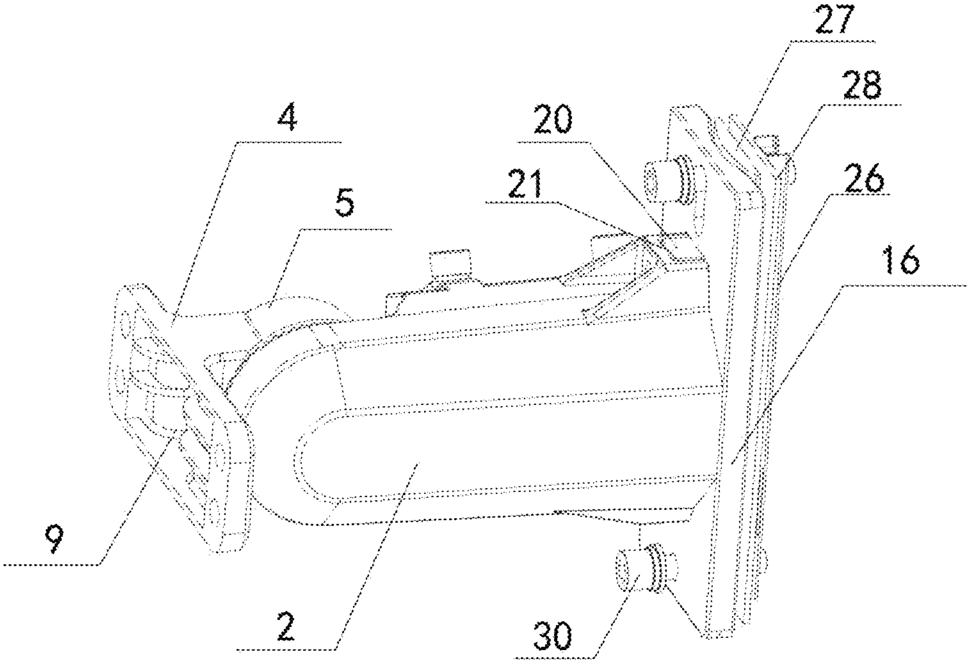
FIG. 6 is similar to FIG. 5, but viewed from another aspect.

The main body 5 is provided with an angle gauge 29. The angle gauge 29 is exposed to the outside, so that a user can observe an adjusted angle from the outside when adjusting the angle. When the mounting member 2 and the connecting block 3 are located on the same line, the angle gauge 29 indicates 0 degrees. As shown in FIG. 3, a middle position of the angle ruler 29 is a position of 0 degrees, and an angle value of the angle gauge 29 increases from the middle position clockwise and counterclockwise to 90 degrees, and the unit of the angle gauge 29 is 10 degrees. An accuracy of the angle gauge 29 is 10 degrees. When adjusting the mounting member 2 and the connecting block 3, the user can adjust the mounting member 2 and the connecting block 3 to the required angle according to the angle value indicated on the angle gauge 29.

The fixing base 4 has a first cavity 9, the main body 5 has a second cavity 10, and the mounting member 2 has a third cavity 11. The first cavity 9 is in communication with an interior of the lamp body 1, and the second cavity 10 is in communication with the first cavity 9 and the third cavity 11, so that wires of the lamp body 1 extend through the mounting bracket assembly and connected to an external power supply.

The mounting member 2 may further be provided with a wiring opening 12, a wiring cover 13 may be covered on the wiring opening 12, and a waterproof silica gel 14 may be provided between the wiring opening 12 and the wiring cover 13, so as to achieve a good waterproof effect.

Figure 7:
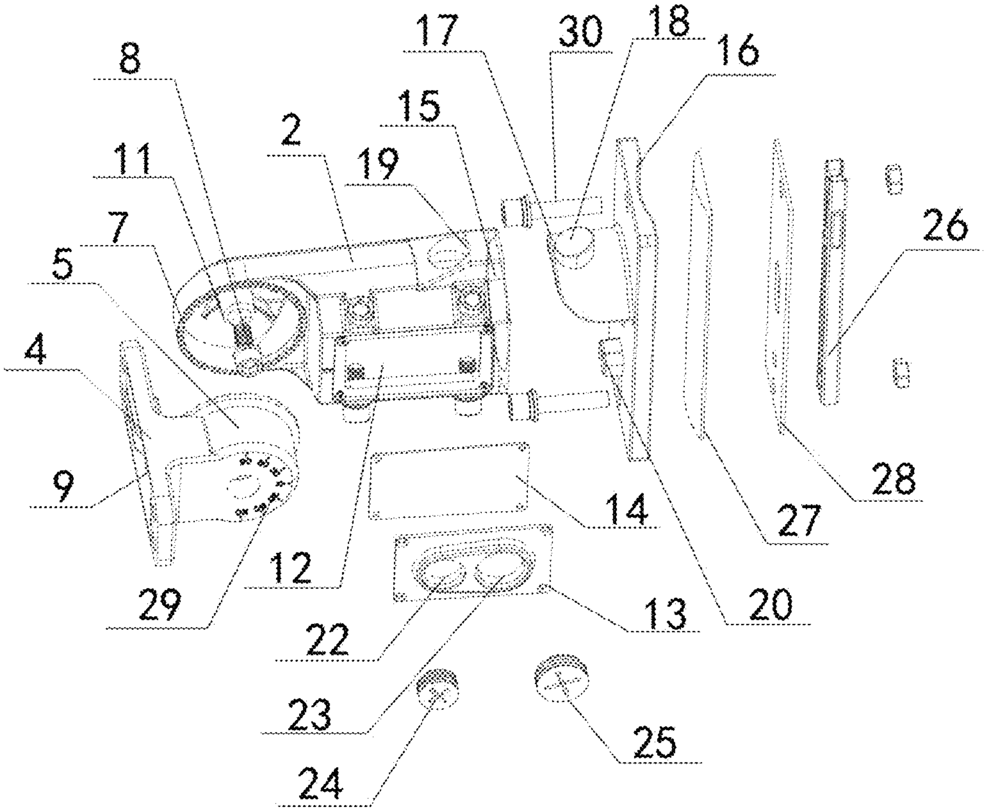
FIG. 7 is an exploded view of the mounting bracket of FIG. 5.
Figure 8:
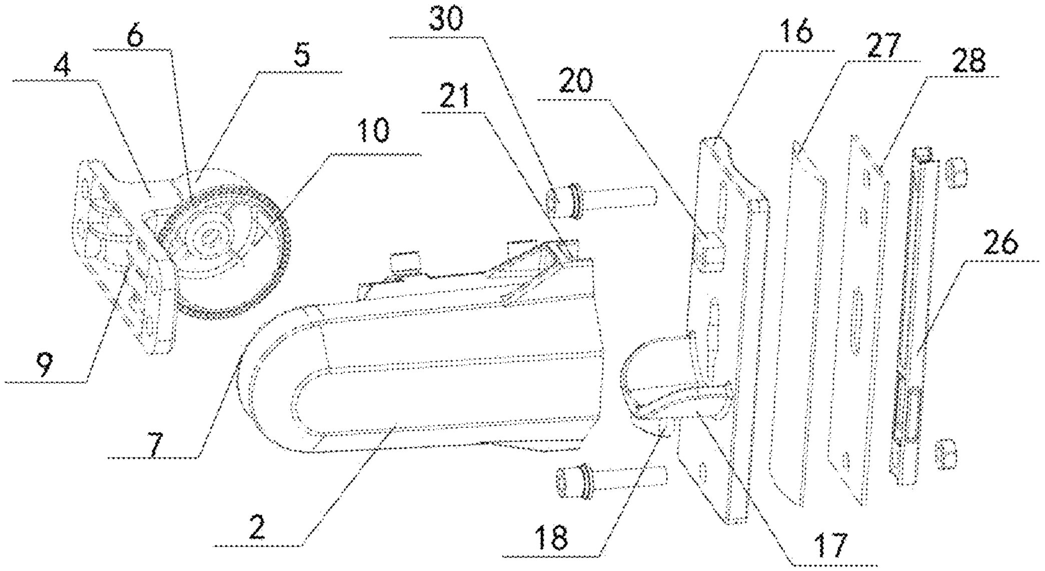
FIG. 8 is similar to FIG. 7, but viewed from another aspect.

In an embodiment, the mounting member 2 is provided with a vertical opening 15 (see FIG. 7) and is configured to be connected to the fixed object. That is, when the mounting bracket is required to be mounted on a lamp pole that is vertically or horizontally arranged, the mounting member 2 can be directly connected to the lamp pole through the vertical opening 15.

In an optional embodiment, the mounting bracket further includes a conversion bracket 16 mounted to an end of the mounting member 2 away from the connecting block 3. One side of the conversion bracket 16 is connected to the mounting member 2 through a quick dismounting structure, and the other side of the conversion bracket 16 is configured to be fixedly connected to the fixed object. Specifically, the conversion bracket 16 includes a connecting member 17 that can extend through the third cavity 11. The connecting member 17 is provided with a positioning column 18, and a side wall of the third cavity 11 is provided with a through hole 19 corresponding to the positioning column 18. The positioning column 18 is engaged the through hole 19. The conversion bracket 16 further includes a protrusion 20. The mounting member 2 is provided with a fixing groove 21 corresponding to the protrusion 20. The protrusion 20 is received in the fixing groove 21.

When the lamp needs to be mounted to a wall with a flat surface or a horizontal surface, the mounting bracket is mounted to the conversion bracket 16, so that the connecting member 17 extends through the third cavity 11 of the mounting member 2, and the positioning column 18 is engaged in the through hole 19. At this time, the protrusion 20 is received in the fixing groove 21. In order to fix the mounting member 2 more firmly to the conversion bracket 16, a second fixing member extends through the protrusion 20 and is fixedly connected to the mounting member 2, so as to fix the protrusion 20 in the fixing groove 21. The second fixing member may be a bolt, and the bolt passes through the protrusion 20 and the fixing groove 21 to fix the protrusion 20 in the fixing groove 21. When the mounting bracket needs to be replaced, the second fixing is removed, and the positioning column 18 can be separated from the through hole 19. At the same time, the protrusion 20 is separated from the fixing groove 21, and the mounting bracket can be removed for replacement or maintenance.

The mounting bracket further includes a fixing block 26. The conversion bracket 16 may also be connected to the fixed object through the fixing block 26. A first silicone pad 27 or a second silicone pad 28 is provided between the conversion bracket 16 and the fixing block 26. Both sides of the first silicone pad 27 are arc-shaped and rectangular respectively. The second silicone pad 28 is a rectangular plate. The first silicone pad 27, the second silicone pad 28 and the fixing block 26 are respectively provided with mounting holes and are fixed to the fixed object through a third fixing member 30.

When the conversion bracket 16 is mounted on a round lamp pole, the first silicone pad 27 is provided between the conversion bracket 16 and the fixing block 26. When the conversion bracket 16 is mounted on a rectangular lamp pole, the second silicone pad 28 is provided between the conversion bracket 16 and the fixing block 26.

Referring to FIGS. 1 to 4, a side wall of the mounting member 2 is provided with a first wire receiving hole 22 and a second wire receiving hole 23 for the wires to extend through. A first blocking member 24 and a second blocking member 25 are detachably provided in the first wire receiving hole 22 and the second wire receiving hole 23, so as to achieve good waterproof and dustproof effects.

In this embodiment, the lamp includes the lamp body 1, an LED lamp plate, a lens plate, and a driving power supply. The driving power supply is configured to drive the LED light board. A front side of the lamp body 1 is provided with a mounting groove. The LED light board is fixedly mounted in the mounting groove. The lens plate covers a light-emitting surface of the LED lamp to prevent glare from light emitted by the lamp body 1, so as to improve the softness of the light emitted by the lamp body 1 and create a comfortable lighting environment.

Referring to FIGS. 5 to 8, the mounting bracket according to a second embodiment is similar to that of the embodiment 1, and the main difference lies in that the first wire receiving hole 1 22 and the second wire receiving hole 23 are provided on the wiring cover 13.

According to the mounting bracket, the connecting block 3 is rotated relative to the mounting member 2 to adjust the angle between the two, which is convenient for an operator to adjust to the desired angle. When the lamp needs to be mounted to a lamp pole that extends vertically or horizontally, the fixing base 4 located on the connecting block 3 is connected to the lamp body 1, and the mounting member 2 is directly connected to the lamp pole. When the lamp needs to be mounted to a wall or other structure with a flat surface, the mounting member 2 is connected to the wall or other structure with a flat surface through the conversion bracket 16. A variety of flexible methods to mount the lamp are realized, which saves the cost of replacing the mounting bracket. Since one side of the conversion bracket 16 is connected to the mounting member 2 through the quick disassembly structure, the mounting bracket can be quickly disassembled and assembled, which is more convenient for replacement or maintenance.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A mounting bracket for a lamp, comprising a mounting member and a connecting block, wherein the connecting block is rotatably connected to the mounting member to adjust an angle between the connecting block and the mounting member, the connecting block comprises a fixing base and a main body, the fixing base is connected to a lamp body of the lamp, and the mounting member is configured to be connected to a fixed object;

wherein the conversion bracket comprises a connecting member extending through the third cavity, the connecting member is provided with a positioning column, a side wall of the third cavity is provided with a through hole, and when the connecting member extends through the third cavity, the positioning column is engaged in the through hole;

wherein the conversion bracket further comprises a protrusion, the protrusion is located on a side of the conversion bracket adjacent to the mounting member, the mounting member is provided with a fixing groove corresponding to the protrusion, and the protrusion is received in the fixing groove.

2. The mounting bracket according to claim 1, wherein the mounting member is provided with a vertical opening and configured to be connected to the fixed object.

3. The mounting bracket according to claim 2, wherein a side wall of the mounting member is provided with a wire receiving hole for a wire to extend through.

4. The mounting bracket according to claim 1, further comprising a conversion bracket mounted to an end of the mounting member away from the connecting block, one side of the conversion bracket is connected to the mounting member through a quick dismounting structure, and another side of the conversion bracket is configured to be connected to the fixed object.

5. The mounting bracket according to claim 4, wherein the fixing base has a first cavity, the main body has a second cavity, the mounting member has a third cavity, the first cavity is in communication with an interior of the lamp body, and the second cavity is in communication with the first cavity and the third cavity.

6. The mounting bracket according to claim 1, wherein further comprising a fixing block, wherein the conversion bracket is connected to the fixed object through the fixing block, and a silicone pad is provided between the conversion bracket and the fixing block.

7. The mounting bracket according to claim 1, wherein the main body is of a columnar structure, the main body comprises a plurality of first teeth that enclose a circle, the mounting member comprises a plurality of second teeth adapted to the plurality of first teeth, the main body is rotated relative to the mounting member by engaging the first teeth with the second teeth, so as to adjust the angle between the mounting member and the connecting block.

8. The mounting bracket according to claim 7, wherein the main body and the mounting member are fixed by a first fixing member, and the first fixing member extends through the mounting member and the main body to fix the mounting member and the connecting block.

9. The mounting bracket according to claim 7, wherein the main body is provided with an angle gauge, and the angle gauge is exposed to the outside.

* * * * *